US008774553B1

(12) United States Patent
Winn

(10) Patent No.: US 8,774,553 B1
(45) Date of Patent: Jul. 8, 2014

(54) ADVANCED ADAPTIVE CONTRAST ENHANCEMENT

(75) Inventor: Stuart Martin Winn, Salem, VA (US)

(73) Assignee: Exelis, Inc., McLean, VA (US)

( * ) Notice: Subject to any disclaimer, the term of this patent is extended or adjusted under 35 U.S.C. 154(b) by 157 days.

(21) Appl. No.: 13/352,751

(22) Filed: Jan. 18, 2012

Related U.S. Application Data

(60) Provisional application No. 61/483,929, filed on May 9, 2011.

(51) Int. Cl.
| G06K 9/00 | (2006.01) |
| G06K 9/40 | (2006.01) |
| G06T 5/40 | (2006.01) |
| G06T 5/50 | (2006.01) |

(52) U.S. Cl.
CPC .... G06T 5/40 (2013.01); G06T 5/50 (2013.01)
USPC .......................... 382/274; 382/168; 382/169

(58) Field of Classification Search
None
See application file for complete search history.

(56) References Cited

U.S. PATENT DOCUMENTS

| 6,463,173 | B1 | 10/2002 | Tretter | |
| 6,650,774 | B1 * | 11/2003 | Szeliski | 382/169 |
| 7,102,697 | B2 | 9/2006 | Lei | |
| 8,295,596 | B1 * | 10/2012 | Srinivasan et al. | 382/168 |
| 2004/0008903 | A1 * | 1/2004 | Kim | 382/274 |
| 2004/0258324 | A1 * | 12/2004 | Liang et al. | 382/274 |
| 2007/0172145 | A1 * | 7/2007 | Altunbasak et al. | 382/274 |
| 2008/0247665 | A1 * | 10/2008 | Hsu | 382/274 |
| 2008/0310714 | A1 | 12/2008 | Stern | |
| 2010/0085361 | A1 * | 4/2010 | Kim et al. | 345/428 |
| 2010/0157078 | A1 * | 6/2010 | Atanassov et al. | 348/222.1 |
| 2010/0278423 | A1 * | 11/2010 | Itoh et al. | 382/169 |
| 2010/0290702 | A1 * | 11/2010 | Yu et al. | 382/171 |
| 2011/0285911 | A1 * | 11/2011 | Astrachan et al. | 348/659 |

* cited by examiner

*Primary Examiner* — Li Liu
(74) *Attorney, Agent, or Firm* — RatnerPrestia

(57) ABSTRACT

A method of enhancing an image includes: dividing the input image into multiple tiles; and constructing a respective histogram for each respective multiple tile. The method further includes: dividing each respective histogram into multiple portions, in which each portion represents a count of pixels spanning across pixel intensity value bands. The method also includes: constructing a respective cumulative distribution function (CDF) for each of the multiple portions; and transforming each of the multiple portions using the respective CDF. Each histogram may be divided, as an example, into two portions.

5 Claims, 8 Drawing Sheets

ADVANCED ADAPTIVE CONTRAST ENHANCEMENT

STATEMENT REGARDING FEDERALLY SPONSORED RESEARCH

This invention was made under Dakota Project Contract No. 13635723 and the United States Government may have certain rights in this invention.

CROSS-REFERENCE TO RELATED APPLICATIONS

This application claims priority to U.S. Provisional Patent Application No. 61/483,929, filed May 9, 2011, the contents of which are incorporated by reference herein in its entirety.

FIELD OF THE INVENTION

The present invention relates, in general, to image processing. More specifically, the present invention relates to contrast enhancement of images by histogram manipulation.

BACKGROUND OF THE INVENTION

A digital image is an array of pixels, with each pixel having a digital value. Typically, in continuous tone black and white images the pixel values represent gray scale values.

Pixel values for an image have to conform to a specified range. For example, each array element may be one byte, i.e., eight bits. In this example, the pixel values range from 0 to 255. In a gray scale image, the 255 may represent absolute white, and the 0 may represent total black.

Color images include three color planes, generally corresponding to red, green, and blue (RGB). For a particular pixel, there is one value for each of these color planes, i.e., a value representing the red component, a value representing the green component, and a value representing the blue component. By varying the intensity of these three components, all colors in the color spectrum may be formed.

Many images, however, do not have pixel values that make effective use of the full dynamic range of available pixel values. For example, in the eight-bit example, a particular image may in its digital form only contain pixel values ranging from 100 to 150, i.e., the pixels fall somewhere in the middle of the gray scale. Similarly, an eight-bit color image may also have RGB values that fall within a range somewhere in middle of the range. The result in either case is that the output is relatively dull in appearance.

It is desirable, therefore, to enhance an image acquired by a camera or sensor to reveal additional detail in the image. For example, where images are taken in the presence of a bright light, details in shadows and in bright areas are often lost. Likewise, details are often lost in dark areas of dark images. As such, it is desirable to reveal such details without compromising overall image quality.

The visual appearance of an image may often be improved by remapping the pixel values to take advantage of the full range of possible outputs. That procedure is called contrast enhancement.

Contrast enhancement techniques are often based on histogram equalization. In histogram equalization, a histogram of gray level distribution of an image is constructed. A histogram is a one dimensional array with an array element corresponding to each value in the range of pixel values. Each histogram element contains a count of the number of pixels that has the particular pixel value corresponding to that element. In histogram equalization, the pixel values in the image are altered to make the distribution of gray level values as uniform as possible.

The present invention, as will be explained, improves upon the technique of histogram equalization.

SUMMARY OF THE INVENTION

To meet this and other needs, and in view of its purposes, the present invention provides a method of enhancing an image. The method includes the steps of: constructing a histogram corresponding to an input image, the histogram providing a distribution of pixel intensity values of the input image; dividing the histogram into multiple portions, each portion representing a count of pixels spanning across successive pixel intensity value bands; constructing a cumulative distribution function (CDF) for each of the multiple portions; and transforming each of the multiple portions using a respective CDF.

The method further includes the step of: dividing the input image into multiple tiles. In addition, constructing the histogram includes: constructing a respective histogram for each respective multiple tile; and dividing the histogram includes dividing each of the respective histograms into the multiple portions. Dividing the input image includes dividing the multiple tiles so that each tile is a region in the input image of n×m pixels, where n and m are integer values. Each region in the input image has 64×64 pixels, for example.

Transforming includes the step of: convolving a CDF of a pixel under consideration in a tile with corresponding CDFs of pixels in adjacent tiles to form an enhanced pixel in an output image. In addition, convolving includes the following steps: finding four corresponding CDFs from four closest tiles, respectively, to the pixel under consideration; and performing a weighted average of the four corresponding CDFs, based on distance from the pixel under consideration to centers of the respective tiles. Performing the weighted average includes: finding distances, in an X-direction, from the pixel under consideration to the centers of the four tiles to form two CDF values; and finding a distance, in a Y-direction, from the pixel under consideration to the two CDF values to form one CDF value.

Furthermore, the steps of dividing, constructing and transforming includes using tiles from a previous image frame; and the step of convolving includes modifying a CDF of a pixel in a present image frame using CDFs from the previous image frame.

Dividing the histogram may include, for example, dividing the histogram into two portions. A first portion includes a count of pixels spanning between zero and 50 percent of maximum pixel intensity, and a second portion includes a count of pixels spanning between 50 percent and 100 percent of maximum pixel intensity.

The method also includes the step of: displaying an output image, after transforming each of the multiple portions.

The method may also include the steps of: applying a bias value to the histogram; and applying a plateau value to the histogram.

Another embodiment of the present invention is a method for enhancing an image provided to a display of a night vision goggle (NVG) system. The method includes the steps of: receiving the image in the NVG system; dividing the image into multiple tiles: constructing multiple histograms for each tile, wherein each histogram represents a distribution of pixel intensity values in each tile; constructing a cumulative histogram as a CDF for each of the multiple histograms; transforming each tile using a respective CDF per each histogram; and displaying an enhanced image on the NVG system.

The method of the above embodiment includes the following step: convolving a CDF of a pixel under consideration in a tile with corresponding CDFs of pixels in adjacent tiles to form an enhanced pixel in an output image. Convolving includes the following sub-steps: finding four corresponding CDFs from four closest tiles, respectively, to the pixel under consideration, and performing a weighted average of the four corresponding CDFs, based on distance from the pixel under consideration to centers of the respective tiles. Performing the weighted average includes: finding distances in an X-direction from the pixel under consideration to the centers of the four tiles to form two CDF values; and finding a distance in a Y-direction from the pixel under consideration to the two CDF values to form one CDF value.

The method of the above embodiment which includes constructing multiple histograms may have the following step: constructing first and second histograms for each tile. The first histogram includes a count of pixels spanning between 0 and 50 percent of maximum pixel intensity, and the second histogram includes a count of pixels spanning between 50 and 100 percent of maximum pixel intensity.

Yet another embodiment of the present invention is an NVG system. The system includes: an image intensifier for amplifying a low level light from a scene, a processor for receiving the amplified low level light and forming an enhanced image of the scene, and a display for viewing the enhanced image. The processor executes the following steps: (a) forming an image from the amplified low level light, (b) dividing the image into multiple tiles; (c) constructing multiple histograms for each tile, wherein each of the multiple histograms represents a distribution of pixel intensity values in each tile; (d) constructing a cumulative histogram as a CDF for each of the multiple histograms; (e) convolving a CDF of a pixel under consideration in a tile with corresponding CDFs of pixels in adjacent tiles to form an enhanced pixel in an output image; and (f) displaying the output image in the NVG system.

The processor may include the following steps: applying a bias value to the histogram; and applying a plateau value to the histogram.

The processor may include a module for applying the plateau value by executing the following step: (a) clipping the histogram at a predetermined level, in which the clipping spans across the distribution of pixel intensity values per histogram. The predetermined level is dependent upon a type of sensor, including an NVG sensor.

The processor may include a module for convolving a CDF of a pixel under consideration with corresponding CDFs of pixels in adjacent tiles to form an enhanced pixel in an output image. The module for convolving performs the following step: performing a weighted average of four corresponding CDFs based on distances from the pixel under consideration to centers of the four respective tiles.

It is understood that the foregoing general description and the following detailed description are exemplary, but are not restrictive, of the invention.

BRIEF DESCRIPTION OF THE DRAWINGS

The invention may be understood from the following detailed description when read in connection with the accompanying figures.

DETAILED DESCRIPTION OF THE INVENTION

Camera systems record the scene they sense. If it is dark, the scene histogram tends to be narrow and low. If it is too bright, it tends to be narrow and high. Ideally, a scene should use the entire display resolution and capture the scene without any distracting artifacts, or noise. Automatic gain control (AGC) is used to adjust sensor gain to capture the scene using full resolution of the display, while minimizing intensity clipping at dark or bright spots.

When there are insufficient amounts of light or gain applied to the sensor, the resulting image may have too little contrast. The un-aided eye has difficulty picking out details that exist, but are hidden in the image. To overcome this deficiency, a received frame of raw video is placed in different bins, each bin representing a different video level, so that a histogram of the frame may be produced. The present invention assumes that the next frame of video will have a similar histogram. Accordingly, the current histogram is used on the next frame of video, in order to apply a relative ranking to the video. If the input pixel ranks at the $50^{th}$ percentile, for example, then the output value given to this pixel will be at 50 percent of the maximum video level. For a 12 bit display, this corresponds to an ADU value of 2048. This is histogram equalization.

A problem with histogram equalization is that it may easily cause distracting artifacts or noise. What was a dark pixel may become white, if it was the brightest of the dark pixels. This causes confusion to the viewer. In order to overcome this deficiency, the present invention splits the histogram into two separate video levels. All of the dark pixels (0-2047 ADU, in a 12 bit display) have their own histogram calculated, and all of the bright pixels (2048-4095 ADU, in a 12 bit display) have their own histogram calculated.

If the arriving raw video is in the dark half, the present invention only translates/stretches the video within the dark half of the video. If the video is in the bright half, the present invention only translates/stretches the video within the dark half of the video. Partitioning the translating/stretching into two separate portions prevents dark pixels from becoming too bright and bright pixels from becoming too dark. This method limits noise and artifact associated with applying histogram equalization to a scene.

Figure 1:
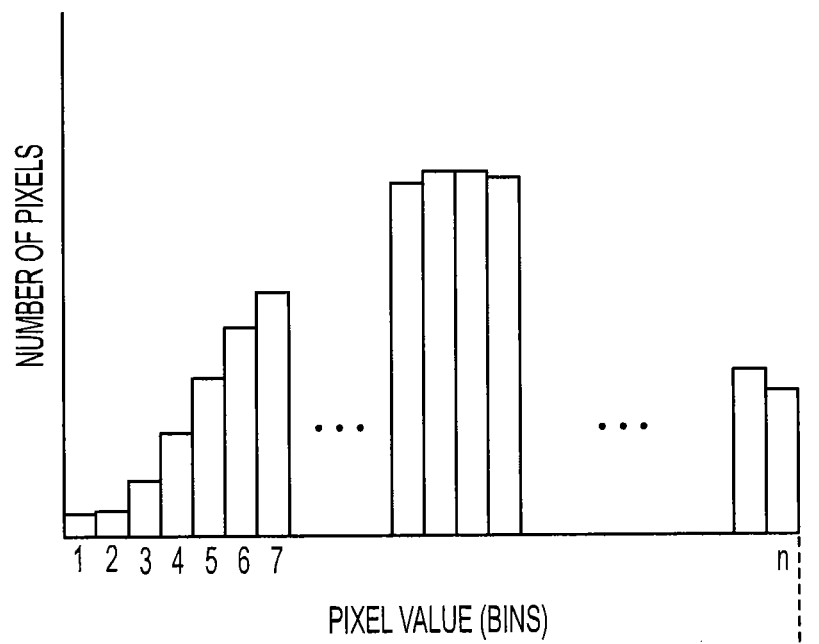
FIG. 1 is an example of a histogram showing the distribution of numbers of pixels across different intensity bins that vary from zero intensity to a maximum display intensity.

Referring now to FIG. 1, there is shown a histogram that may be calculated by the present invention. As shown, all the pixels are placed in different bins, in which each bin represents a unique intensity value. In a 12 bit display, the intensity value may vary between 0 and 4095 ($2^{12}-1$) ADU. Accordingly, the value of n in FIG. 1 is 4095 ADU. There may be a bin for each possible intensity value; for example, there may be 4096 bins where each bin has an integer value. As another example, each bin may represent a range of intensity values; thus, if each bin includes a range of 64 ADU values, then the value of the first bin in FIG. 1 may be 0-63 ADU, the value of the second bin may be 64-127 ADU, and the value of bin n may be 4032-4095 ADU.

It will be appreciated that a counter may be used for each bin. In this manner, every time a pixel is received that belongs in a certain bin, the counter for that bin adds "1" to the previous counter. Thus, a distribution of intensity values is obtained for each image. This distribution may also be referred to as a probability distribution function (PDF).

It will be understood that a histogram, or PDF may be obtained for each input video channel. Accordingly, for a monochrome image, which has gray values, only one histogram or PDF may need to be computed. For a colorized image, on the other hand, which has luminance values (Y) and two chrominance values (Cr, Cb), three histograms may be calculated, one for each input channel.

An underlying principle of histogram equalization is that, for maximum image information perception, the image luminance value distribution (histogram) should be uniform over the entire image intensity range. Through mapping the pixel luminance values by means of a histogram equalization transformation curve, the pixel luminance values of the transformed image may be distributed as uniformly as possible over the whole dynamic range.

Figure 2:
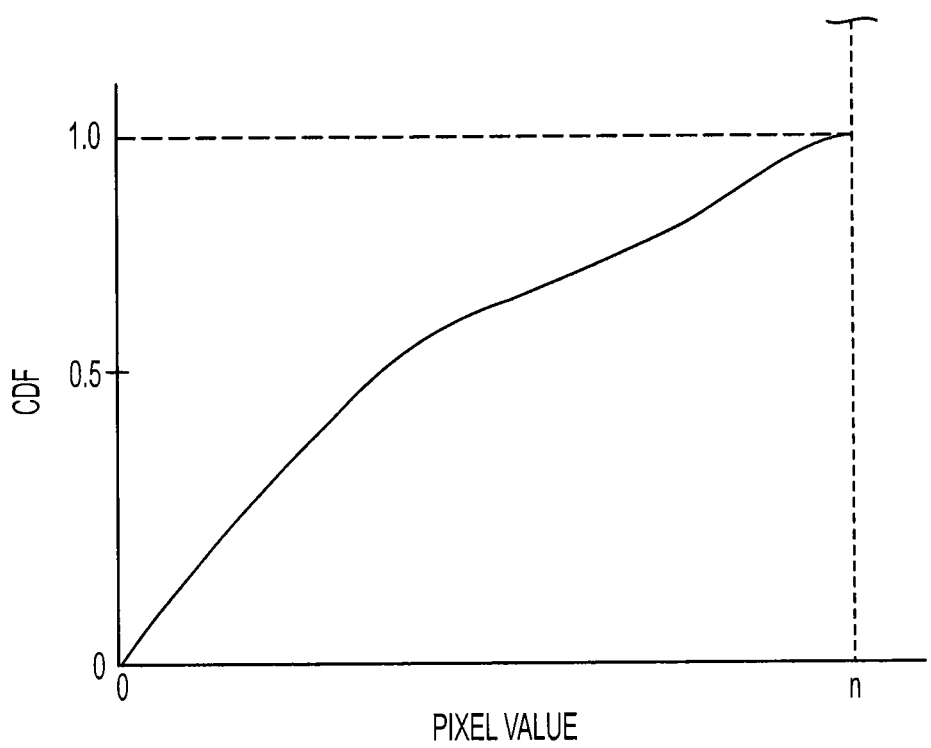
FIG. 2 is an example of a cumulative distribution function (CDF) of the histogram shown in FIG. 1.

The transformation curve may be obtained from the histogram of the original image. In order to generate the appropriate transformation curve, a cumulative histogram (also called cumulative distribution function, or CDF) may be calculated by accumulating the histogram values. The cumulative histogram may be normalized, such that a suitable transformation function for mapping the luminance levels is obtained. An example of a CDF curve is shown in FIG. 2.

Sometimes, the extent to which an image is changed by histogram equalization is undesirable. After performing a histogram equalization, it may happen that the image brightness is changed too much. For example, an image taken during the night may look like an image taken in the daytime. It may also happen that the natural impression of the image is lost, for example, a human face may not look realistic.

In order to overcome the aforementioned deficiency, the present invention, for example, may split the histogram into two separate intensity levels. When a pixel arrives that has an intensity level of less than or equal to 50% of the maximum ADU, the pixel goes to the dark-half of the image. When the pixel has an intensity level greater than 50% of the maximum ADU, however, the pixel goes to the bright-half of the image. A histogram may next be computed separately for the dark-half of the image and the bright-half of the image. The two separate histograms are shown as examples in FIGS. 3 and 4. As shown, FIG. 3 is an example of a histogram for the pixels belonging in the dark-half of the image; and FIG. 4 is an example of a histogram for the pixels belonging in the bright-half of the image.

Figure 3:
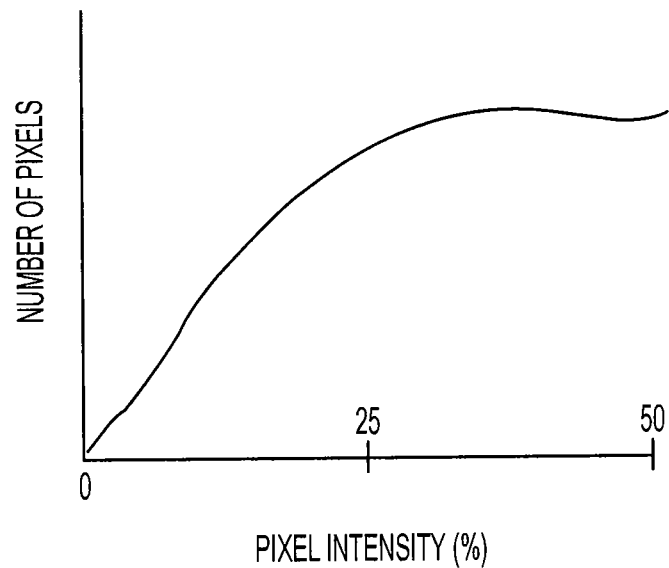
FIG. 3 is an example of a histogram showing the distribution of pixels across different intensity values spanning from 0 to 50 percent of maximum display intensity.
Figure 4:
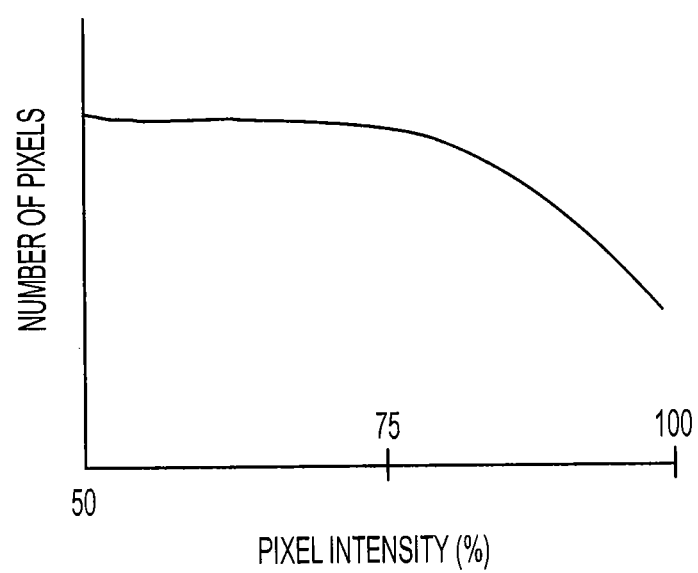
FIG. 4 is an example of a histogram showing the distribution of pixels across different intensity values spanning from 50 to 100 percent of maximum display intensity.

It will be understood that an embodiment of the present invention, as shown in FIGS. 3 and 4, is based on partitioning, or dividing the histogram at the 50% intensity level of the maximum intensity value in the display. The partitioning, however, need not be at the 50% level and may be at some other level, for example, the 75% level, or 25% level. It will further be understood that another embodiment of the present invention may contemplate more than two separate histograms of an image. For example, the invention may include four separate histograms that are partitioned at 25%, 50% and 75% of maximum ADU level of the display.

Figure 5:
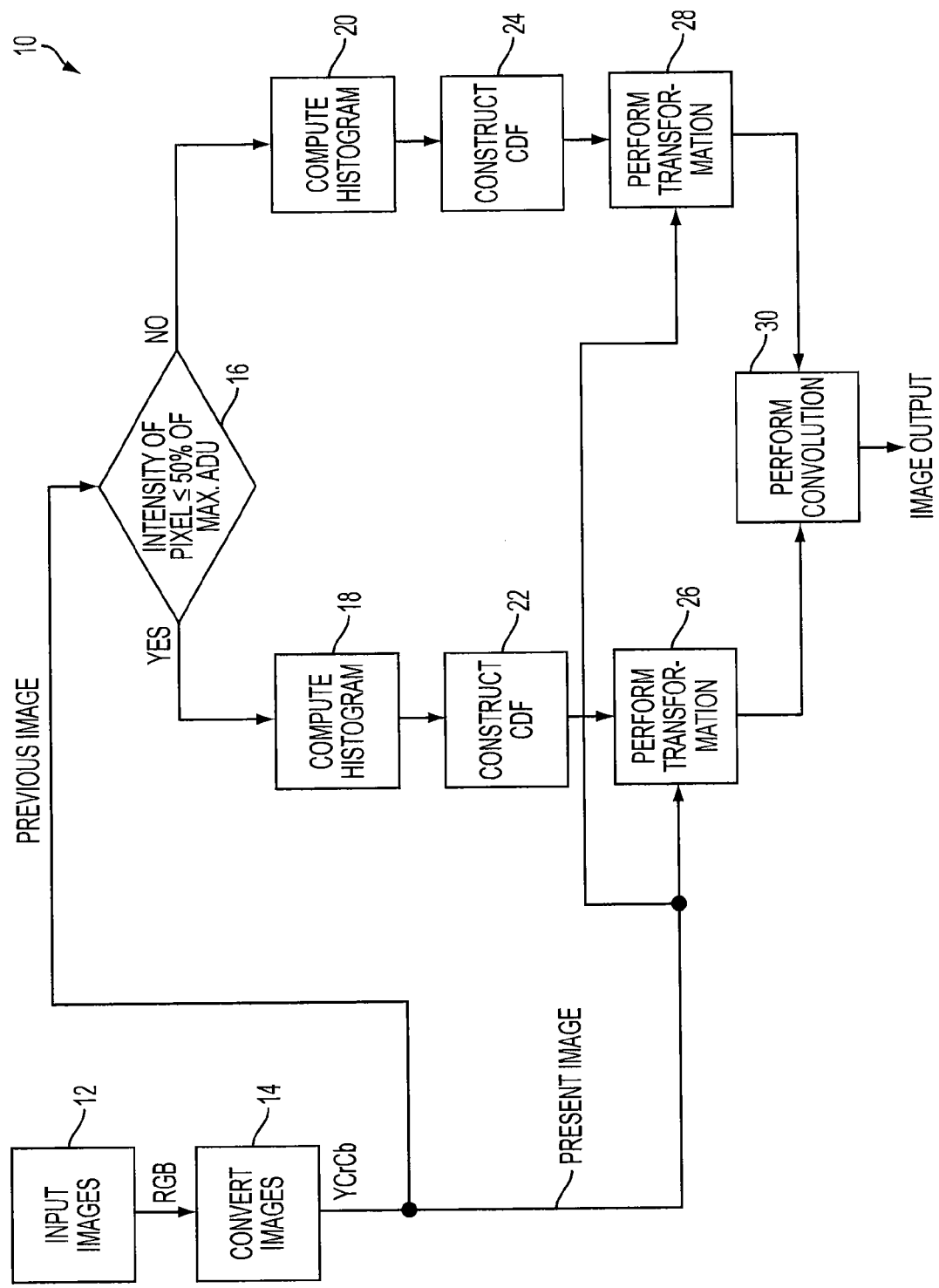
FIG. 5 is a flow diagram of a method of enhancing an image, in accordance with an embodiment of the present invention.

Referring next to FIG. 5, there is shown an embodiment of the present invention, generally designated as method 10. The method receives input images in step 12. These images are received in one channel including gray scale images. These images may also be received in three separate channels that include the RGB domain, as an example, and may be converted into the YCrCb domain. After conversion, each image may be separated into three channels, a Y channel, Cr channel and Cb channel. The method then performs the following steps.

The images are outputted by step 12 as a succession of images. The images may be buffered in a storage medium (not shown) prior to step 12 outputting each image. As shown, the previous image is provided to decision box 16, whereas the present image (or current image) is provided to steps 26 and 28.

Receiving the previous image, decision box 16 examines the intensity value of each pixel in that image and determines whether the intensity of each pixel is less than or equal to 50% of the maximum intensity value of the imaging display. If decision box 16 determines that the intensity of a respective pixel is less than or equal to 50% of the maximum intensity level, then the method branches to step 16 and provides the intensity value of that pixel to a histogram computing module executing step 18. On the other hand, if decision box 16 determines that the intensity of the pixel is greater than 50% of the maximum intensity level, then method 10 provides the intensity value of that pixel to another histogram computing module executing step 20. Two histograms are then separately computed by step 18 and step 20.

Method 10 computes separate cumulative distribution functions (CDFs) for each respective histogram. Thus, step 22 constructs a CDF for the histogram computed by step 18, and step 24 constructs a CDF for the histogram computed by step 20.

Two separate transformations are then performed by method 10 on the received present image, the latter transmitted by step 12. The first transformation is performed by step 26 on the first histogram that includes pixels having intensity values spanning from 0% to 50% of maximum intensity level. Step 28 performs another transformation for all pixels determined to have an intensity value greater than 50% of maximum intensity level.

A convolution, which is described in greater detail later, is performed on each pixel that has been transformed by step 26 and step 28. After completing the convolution on the pixel, step 30 provides an enhanced pixel as part of the output pixels of the present image. Method 10 performs the aforementioned steps on each pixel in the present image. In addition, the transformations in steps 26 and 28 are performed on the present image for each channel, for example, a gray scale image.

In histogram equalization, the pixel intensity distribution may be expanded (stretched) or narrowed (collapsed), in order to occupy the full range of possible pixel intensities. According to this method, an input histogram may be constructed, which includes the total number of pixels corresponding to each intensity level within the image. Then, a cumulative histogram may be constructed and normalized, and each pixel in the image may be transformed using a normalized cumulative histogram in a look-up table (LUT).

The present invention provides additional steps to limit overstretching by histogram equalization. First, a settable minimum bias replaces the bin value of every bin of the histogram that is less than the bias value; second, a settable plateau level is applied to every bin of the histogram. The bias ensures that every bin includes at least the bias level. The plateau level prevents any bin region from containing too much of the translated histogram.

Figure 6:
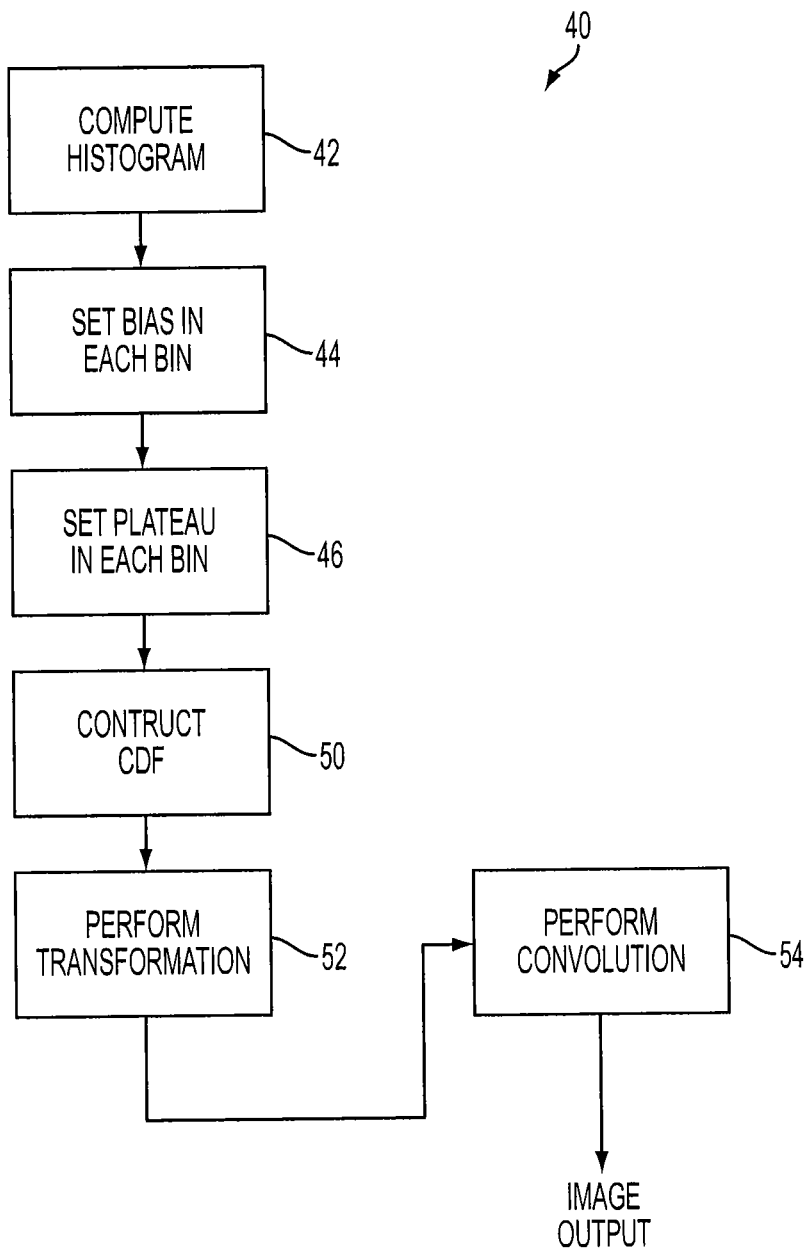
FIG. 6 is a flow diagram of another method of enhancing an image, in accordance with an embodiment of the present invention.

Referring now to FIG. 6, there is shown another embodiment of the present invention, generally designated as method 40. As shown, method 40 computes a histogram in step 42. It will be appreciated that this histogram may be two different histograms, as previously described for method 10 of FIG. 5. Only one histogram, however, is shown being computed by step 42. It will also be appreciated that the present invention may omit forming two different histograms as it may be sufficient to perform the steps of method 40 without partitioning the intensities of pixels into two separate histograms.

As shown, two additional steps 44 and 46 are performed by method 40 that are not performed by method 10 of FIG. 5. Step 44 sets a bias for each bin in the histogram. In general, a bias value is set by the present invention by determining the gain of the image frame under examination and then setting a bias value. For example, if the gain value of the image exceeds a predetermined value, which may be set by a user, then the bias value is increased. On the other hand, if the gain value is below the predetermined value, then the bias value is decreased by the present invention.

Step 46 sets a plateau value for the histogram computed in step 42. The plateau value is set by clipping the histogram at a predetermined level, which may also be determined by a user. The clipping level may span across the entire distribution of pixel intensities in the histogram computed in step 42. It will be understood that the predetermined level may be dependent upon the type of sensor providing the images under display. For example, these sensors may include a night vision goggle (NVG) sensor displaying intensified images of low level light.

Next, a CDF is constructed by step 50, a transformation is performed based on the CDF in step 52 and a convolution is performed in step 54. An enhanced image is provided by method 40. It will be appreciated that steps 50, 52 and 54 are similar to steps 22, 24; steps 26, 28; and step 30 performed by method 10 of FIG. 5.

Figure 7:
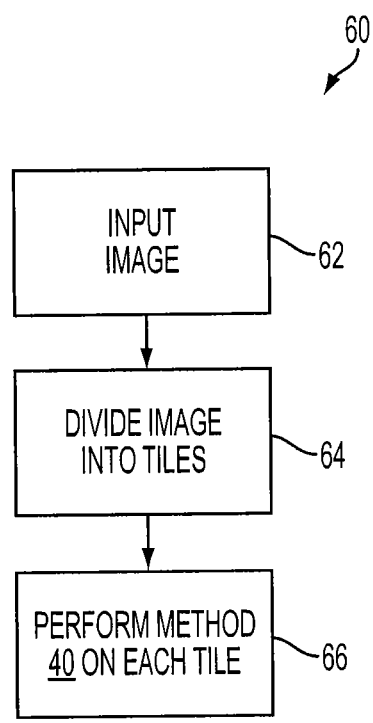
FIG. 7 is a flow diagram of yet another method of enhancing an image, in accordance with an embodiment of the present invention.

Finally, local area processing (LAP) may be applied as another step provided by the present invention. Accordingly, instead of calculating histograms for an entire scene, the scene may be divided, or partitioned into square tiles. A separate histogram may then be calculated for each tile. The division of an image into multiple tiles is shown in FIG. 7. The method 40, shown in FIG. 6, is then performed on each tile.

Additional steps are added by the present invention for performing a convolution between a pixel under consideration in a specific tile and several surrounding tiles. These additional steps effectively provide a smooth transition of intensities from one tile to another tile. The convolution of the tiles permits a viewer to see locally dark, or bright areas better than a reconstructed scene would provide based on no convolution. The convolution is exemplified in FIG. 8.

Referring first to FIG. 7, there is shown a method of the present invention, designated as 60. As shown, the method receives the input images by way of step 62. Step 64 then divides each image into tiles. These tiles may be partitioned in any desirable size. For example, each tile may include 64×64 pixels and there may be 20 tiles horizontally across the image and, correspondingly, 16 tiles vertically down the image. Step 66 may then perform the same steps executed by method 40 for each tile of the input image. Accordingly, each tile includes its own histogram, its own CDF, its own transformation equation and its own convolution steps.

Figure 8A:
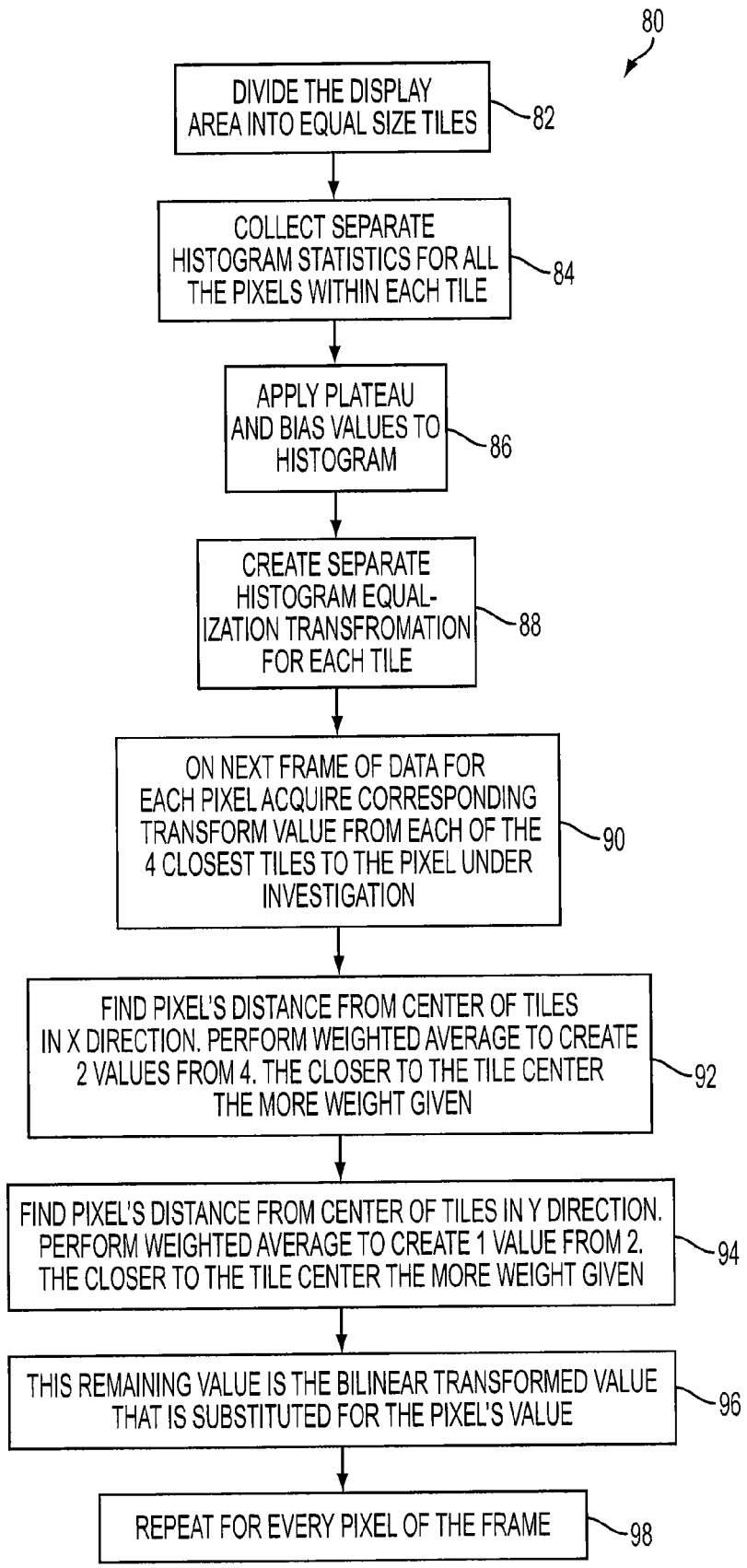
FIG. 8A is a flow diagram showing steps performed by the present invention.

Referring next to FIG. 8A, there is shown method 80, which includes the convolution steps performed by methods 10, 40 and 60. As shown, step 82 divides the image display area into equal size tiles. Step 84 collects separate histogram statistics for each pixel, within each tile. Step 86 applies the plateau and bias values to the histogram constructed by step 84. Separate histogram equalization transformations are formed for each tile by step 88. It will be understood that steps 84 and 86 collect the histogram statistics and apply plateau and bias values to the histogram within each tile for the previous image received in one or more channels processed by the imaging system. Thus, step 88 creates a separate histogram equalization transformation, as a CDF, for each tile in the image. Accordingly, multiple CDFs are formed for the multiple tiles of the image.

Method 80 then performs the remaining steps shown in FIG. 8A for each pixel of the present image (or present frame) received by each channel in the signal chain. The method performs convolution steps 90, 92, 94 and 96 on each pixel of the present image. Accordingly, step 90 acquires corresponding CDF values from each of the four closest tiles to the pixel under investigation (or under consideration). Step 92 finds the horizontal distance (X direction) from the pixel under consideration to the center of the respective four closest tiles. Step 92 performs a weighted average to form two CDF values from the four closest tiles. The closer to the tile center the pixel under consideration is positioned, the more weight that tile is given.

Step 94 then determines the vertical distance (Y direction) of the pixel under consideration to the center of the two CDF values selected for the X direction. Another weighted average is performed to form a single CDF value from the two values found in step 92. Again, the closer to the tile center the pixel under consideration is positioned, the more weight is given to that tile. Step 96 then substitutes the single CDF value found in step 94 for use in transforming the pixel under consideration. This is repeated for every pixel of each tile in the image frame, as depicted by step 98.

Figure 8B:
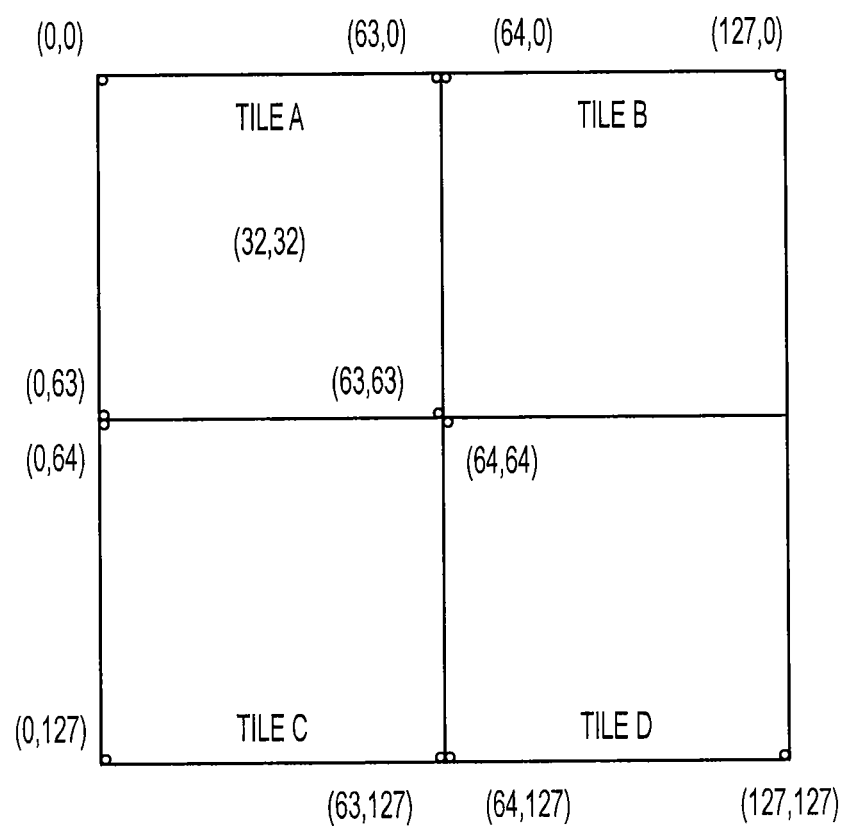
FIG. 8B is an illustration of a convolution process performed by the present invention for one pixel in an image under investigation, in accordance with an embodiment of the present invention.

Referring next to FIG. 8A, there is shown an example of how the pixel under consideration is modified based on corresponding CDF values of its closest neighbor tiles. The example outlined below assumes that the pixel is at position (63, 63) in Tile A and each of the Tiles A, B, C and D includes 64×64 pixels, as shown in the figure. The calculation for the intensity value of the pixel under consideration, using weighted CDF values of four adjacent tiles, is as follows:

Assume that every pixel in the current frame under investigation has a value of 1000 but the previous frame was different and created four (4) unique histograms for four (4) tiles A-D, as shown in FIG. 8B. Thus, each tile will transform the value of 1000 differently.

Assume that the transform of 1000 in
Tile A has a cdf (1000)=1600
Tile B has a cdf (1000)=1200
Tile C has a cdf (1000)=800 and
Tile D has a cdf (1000)=400.

The calculation starts with the pixel at position (63, 63). It is essentially equidistant between the centers of all four (4)

tiles. Thus, the calculation is (1600(33/64)+1200 (31/64))/2, which solves for the average of Tiles A and B as 1406.25.

The 1600 and 1200 are the CDF transforms of Tiles A and B at an intensity of 1000; the 33/64 is how close the pixel is to the center of Tile A in the X direction; the 31/64 is how close the pixel is to the center of Tile B in the X direction. The two fractions have to add up to 64/64.

For the average of Tiles C and D, the calculation is (800 (33/64)+(400(31/64))/2=606.25.

Next, the weighted average of AB and CD in the Y direction is calculated. The equation is (1406.25(33/64)+606.25(31/64))/2=1018.75. This value is close to the expected 1000 average of the four tiles, but since the pixel is just barely closer to Tile A, the value tends towards the higher Tile A's transform.

If, on the other hand, the pixel under consideration is at (32, 32), then the transformation value of pixel (32, 32) is essentially equal to 1600, because it is in the middle of tile A.

Similarly, the transform of pixel (93, 63) would essentially be 1200, since it is in the middle of Tile B.

If the pixel under consideration is at (63, 32), then the transform of pixel (63, 32) would be equidistant from the centers of Tiles A and B and is essentially 1400 ((1600+1200)/2).

Because there are an even number of pixels in a tile (64×64), there is no pixel that is perfectly in the middle of a tile. One may obtain a $63/64^{th}$ contribution from a tile, since the pixel is so close to its center and only obtain a $1/64^{th}$ contribution from a distant tile.

Figure 9:
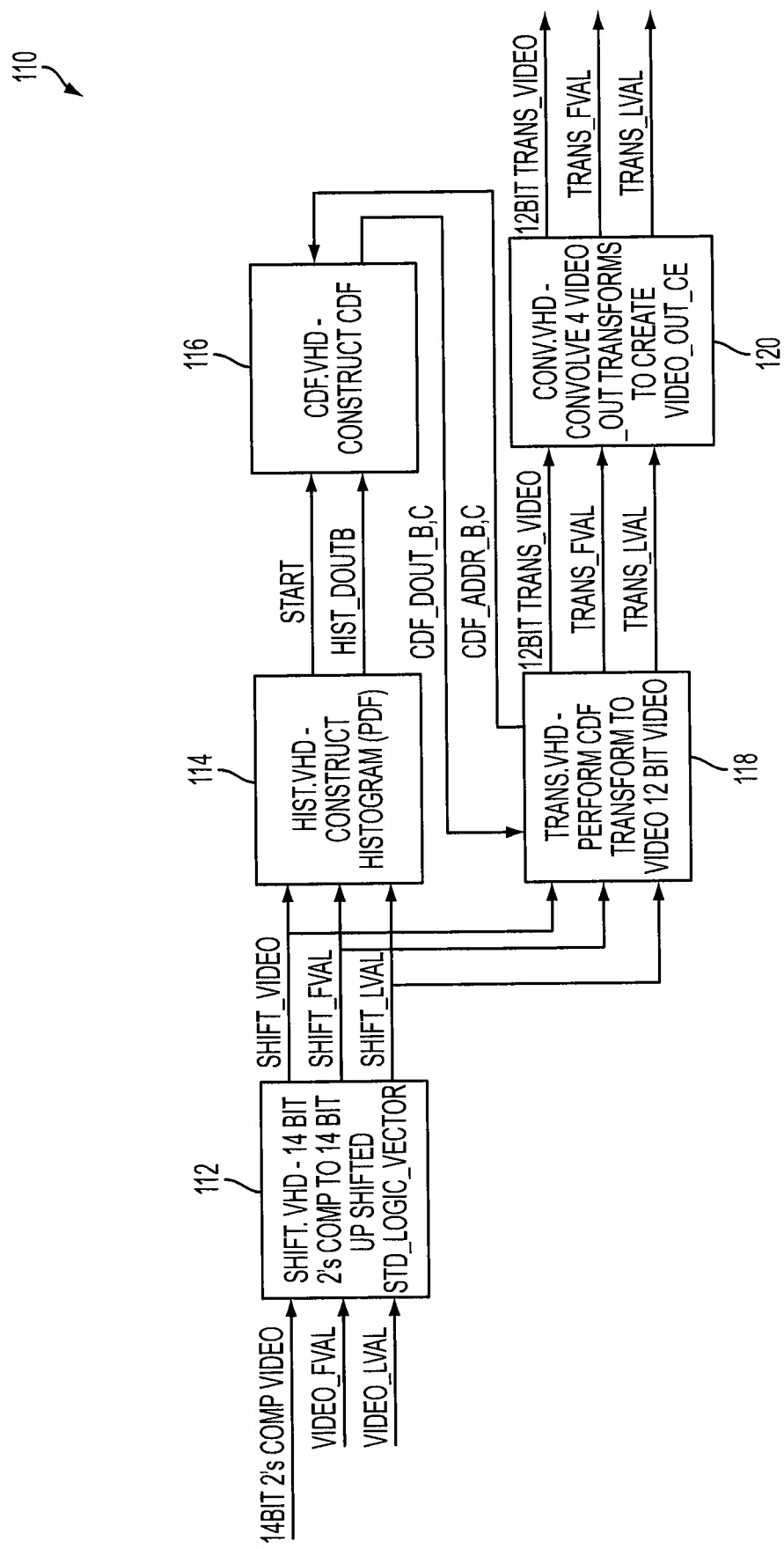
FIG. 9 is a block diagram of an image enhancing system, in accordance with an embodiment of the present invention.

Referring now to FIG. 9, there is shown a block diagram of a system for enhancing an image using the present invention. As shown, system 110 includes a fourteen bit 2s-complement video module 112, a histogram construction module 114, a CDF construction module 116, a transformation module 118 and a convolution module 120. Module 112 formats the input video, image by image, into a proper digital form. Module 114 constructs a histogram for each image; or a separate histogram for each of two different intensity portions of the image (as described with respect to FIG. 5); or a separate histogram for each tile of the image (as described with respect to FIG. 7). Furthermore, the present invention, in performing step 114, may provide two different histograms based on different intensity regions of each tile of an image.

The CDF construction module and the transformation module are performed, respectively, based on each histogram constructed by the histogram construction module 114. As shown in FIG. 9, the convolution performed by convolution module 120 is performed on each pixel of the image frame provided by transformation module 118.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A method of enhancing an image comprising the steps of:
    dividing a previous input image into multiple tiles;
    constructing a histogram for each tile;
    dividing the histogram of each tile into multiple portions, each portion representing a count of pixels spanning across successive pixel intensity value bands;
    constructing a cumulative distribution function (CDF) for each of the multiple portions;
    receiving a present image;
    determining an intensity value for a pixel in the present image;
    finding four adjacent tiles in the previous image that surround the pixel in the present image;
    selecting a CDF of each portion that includes the intensity value of the pixel in the present image;
    transforming the intensity value of the pixel in the present image based on selected CDFs of each portion constructed for the four adjacent tiles in the previous image to obtain four intensity levels; and
    using bilinear interpolation to calculate a single intensity value of the pixel in the present image based on the four intensity levels.

2. The method of claim 1 wherein using bilinear interpolation includes:
    finding distances, in an X-direction, from the pixel in the current image to centers of the four tiles to form two intensity values, and
    finding a distance, in a Y-direction, from the pixel in the current image to the two intensity values to form one intensity value.

3. The method of claim 1 wherein dividing the histogram includes:
    dividing the histogram into two portions, wherein
    a first portion includes a count of pixels spanning between zero and 50 percent of maximum pixel intensity, and
    a second portion includes a count of pixels spanning between 50 percent and 100 percent of maximum pixel intensity.

4. The method of claim 1 including the step of:
    displaying an output image, after transforming each of the multiple portions.

5. The method of claim 1 including the steps of:
    applying a bias value to the histogram; and
    applying a plateau value to the histogram.

* * * * *